United States Patent [19]

Neefe

[11] 4,247,492
[45] Jan. 27, 1981

[54] METHOD OF CONTROLLING THE ADHESION OF CAST LENSES TO THE MOLD

[75] Inventor: Charles W. Neefe, Big Spring, Tex.

[73] Assignee: Neefe Optical Laboratory, Inc., Big Spring, Tex.

[21] Appl. No.: 53,039

[22] Filed: Jun. 28, 1979

Related U.S. Application Data

[63] Continuation-in-part of Ser. No. 945,459, Sep. 25, 1978, abandoned, which is a continuation-in-part of Ser. No. 793,388, May 25, 1977, abandoned.

[51] Int. Cl.³ .............................................. B29D 11/00
[52] U.S. Cl. ................................... 264/2.3; 264/225; 264/337; 264/349; 425/808.
[58] Field of Search .................. 264/1, 225, 337, 349; 425/808; 526/914; 528/502

[56] References Cited

U.S. PATENT DOCUMENTS

| 2,935,502 | 5/1960 | Reding | 528/502 |
| 3,248,469 | 4/1966 | Kosinsky et al. | 264/349 |
| 3,422,168 | 1/1969 | Bowser | 264/1 |
| 3,830,460 | 8/1974 | Beattie | 425/808 |
| 4,121,896 | 10/1978 | Shepherd | 264/1 |

FOREIGN PATENT DOCUMENTS 745135 7/1970 Belgium .............................. 528/502

Primary Examiner—James B. Lowe

[57] ABSTRACT

A method of increasing the adhesion of a cast polymer lens to a resinous lens mold by subjecting the resinous mold material to high internal shear force to alter the molecular structure of the resinous mold material to provide for greater bonding between the mold and lens material.

4 Claims, 4 Drawing Figures

METHOD OF CONTROLLING THE ADHESION OF CAST LENSES TO THE MOLD

Continuation-in-part of application Ser. No. 945,459, filed Sept. 25, 1978 entitled: METHOD OF MOLDING AND SUPPORTING LENSES DURING PROCESSING, now abandoned, which is a continuation-in-part of Ser. No. 793,388 filed May 25, 1977 entitled: A METHOD OF MAKING HIGH QUALITY PLASTIC LENSES, now abandoned.

FIELD OF THE INVENTION

The use of plastic materials for making optical lense has increased rapidly for the past ten years. This is due to the availability of better plastic materials and the physical advantages of the plastic resins for specific applications such as ophthamic lenses. The technology for the production of high quality plastic lenses has not kept pace with the material supply industry. It is important to advance both areas if the full potential is to be realized.

Plastic lenses offer many advantages over glass lenses. They are much lighter in weight and resist breakage. The cost of making high quality lenses has been high due to the problems caused by the shrinkage of the monomer when polymerized, which often breaks the expensive mold.

STATE OF THE ART

The current lens molds are fabricated from steel or glass, each mold is individually ground and polished to the required specifications. To achieve accurate reproduction of the bifocal and toric molds is most difficult and expensive.

An object is to provide a process for making inexpensive molds which may be made to identical specifications.

Another object is to provide a process whereby standard masters may be used to produce a large quantity of replica molds.

The adhesion of the replica mold to the lens material may be increased by subjecting the heated mold material to extreme internal shear forces during processing.

THE LENSES ARE MADE AS FOLLOWS

A master positive mold is made from glass or stainless steel or other materials which will withstand the molding temperatures.

DESCRIPTION OF THE PREFERRED EMBODIMENTS

It has been discovered that the adhesion between the resinous mold material and the lens material can be increased by subjecting the heated resinous mold material to high shear forces such as passing the heated material through a small orifice of from 0.2 m/m to 5 m/m in cross sectional area, at high pressures of 5,000 to 50,000 pounds per square inch and at high velocities. The high internal shear forces produced upon passing through the orifice changes the molecular structure by cleaving some of the molecular chains to create attachment sites to which the monomer lens material will attach itself upon polymerization.

Figure 1:
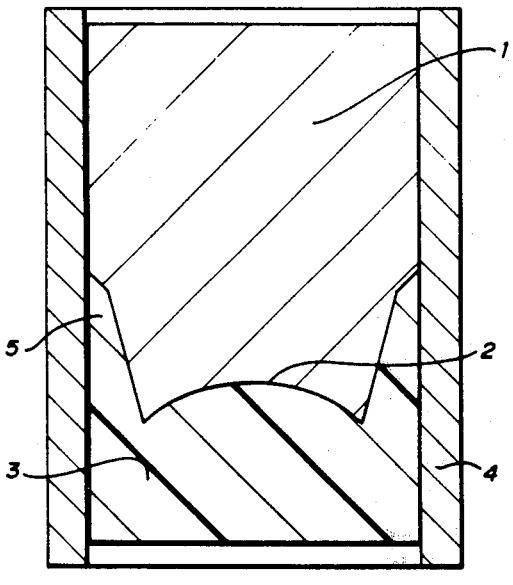
FIG. 1 shows the sleeve, steel mold and a resinous mold material which has been subjected to high shear forces.

The master mold, 1 FIG. 11, is placed in a sleeve, 4 FIG. 1, a molding grade of a resinous material such as polyimide, polycarbonate, polymethylpentene, polyethylene, polypropylene, nylon or other molding material which has been shear treated is placed in the sleeve, 4 FIG. 1. The sleeve and its contents are heated to the softening point of the molding material, pressure is applied to form the lens mold, 3 FIG. 1. The sides of the master mold, 1 FIG. 1, have been cut to a smaller diameter to provide the opening, 5 FIG. 1. When sufficient heat and pressure have been applied, the molding compound, 3, will fill the area around the positive mold, 1, forming a cup-like cavity with a curved optical surface, 2 FIG. 1, at the bottom. Either injection or compression molding may be used to produce the lens molding container. The lens container 3 FIG. 1, is removed from the molding sleeve, 4 FIG. 1, and the optical mold, 1 FIG. 1, is also removed.

CASTING THE OPTICAL SURFACE

Figure 2:
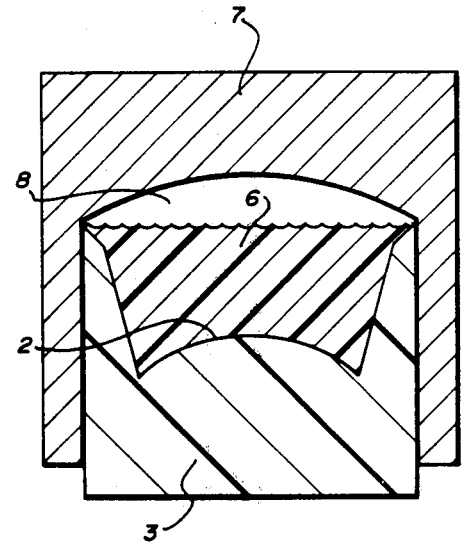
FIG. 2 shows the resinous mold containing the liquid lens monomer with the cover in place.

A liquid or syrup monomer material containing a suitable catalyst, 6 FIG. 2, is placed over the optical surface, 2 FIG. 2, and covered to prevent evaporation with a cover, 7 FIG. 2, an air space, 8 FIG. 2, is provided. The liquid monomer is polymerized to form a solid. Microwave energy or heat may be used to speed the polymerization process. Thermosetting and crosslinked materials may be used to produce lenses which are dimensionally stable. This process is suitable for the production of soft contact lenses which cannot be made by compression or injection molding techniques.

CUTTING THE SECOND OPTICAL SURFACE

Figure 3:
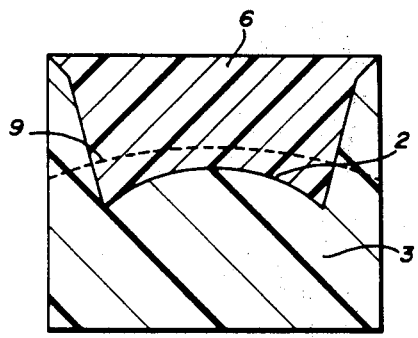
FIG. 3 shows the polymerized lens material with an optical surface molded on the resinous lens.
Figure 4:
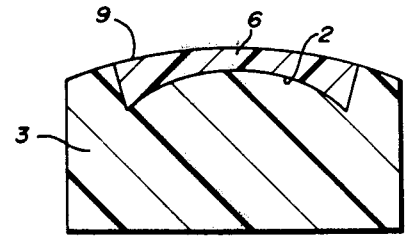
FIG. 4 shows the lens with the second optical surface cut and in the resinous mold.

It is not necessary to remove the hardened plastic lens material, 6 FIG. 3, from the mold, 3 FIG. 3, before cutting the convex curve, 9 FIG. 3. The mold, 3 FIG. 3, may be placed in a suitable lathe and curvature, 9 FIG. 3, cut and polished. The finished lens, 6 FIG. 4, having the molded concave surface, 2, and the convex curvature, 9, which was cut and polished without being removed from the disposable mold, 3 FIG. 4. The cup-like device has served as a container for the monomer, 6 FIG. 2, provided the molded optical surface which for contact lens production may be two or more segments providing the required optical zone , peripheral curves and lens diameter. The cup-like mold, 3 FIG. 3, also serves as the holding block to facilitate cutting to the required thickness. The thickness of the cup bottom may be measured before adding the liquid monomer and measurements may be taken during the cutting operation and the lens thickness determined by subtracting the thickness of the cup bottom. The cup. 3 FIG. 3, which adheres strongly to the lens also serves as a holding fixture during the polishing operation. After the lens is processed to the required specifications, the lens is removed by sharply flexing the holding fixture, 3 FIG. 4, separating the finished lens from its support.

Various modifications can be made without departing from the spirit of this invention or the scope of the appended claims. The constants set forth in the disclosure are given as examples and are in no way final or binding. In view of the above, it will be seen that the several objects of the invention are achieved and other advantages are obtained. As many changes could be made in the above construction and method without departing from the scope of the invention, it is intended that all matter contained in the above description shall be interpreted as illustrative and not in a limiting sense.

That which is claimed is:

1. A method of increasing the adhesion of cast plastic lenses to a resinous lens mold, comprising the steps of: providing a heat softening resinous mold material, subjecting the said mold material to internal shear force, which alters the polymeric structure by cleavage of molecular polymeric chains, thereby increasing the bonding between the cast lens material and the resinous mold, providing a positive lens mold, having a first optical surface curvature, forming a negative optical mold from the positive optical mold by applying said heat softened resinous mold material against the first surface curvature, covering the resinous optical negative mold with a liquid monomer lens material, allowing the said lens material to polymerize to thereby form a lens having a finished optical surface.

2. A method as in claim 1 wherein a second optical surface is cut and polished on the polymerized lens material while the lens material is supported upon the resinous mold adjacent to the lens material.

3. A method of increasing the adhesion of cast plastic lenses to a resinous lens mold, comprising the steps of providing a heat softening resinous mold material, subjecting the said mold material to internal shear force, which alters the polymeric structure by cleavage of molecular polymeric chains, thereby increasing the bonding between the cast liquid monomer lens material which is placed over the resinous negative mold and allowed to polymerize to thereby form a lens having a finished optical surface.

4. A method of increasing the adhesion of cast plastic lenses to a resinous lens mold, comprising the steps of providing a heat softening resinous mold material, subjecting the said mold material to internal shear force, by being forced through an orifice under pressure, which alters the polymeric structure by cleavage of molecular polymeric chains, thereby increasing the bonding between the cast liquid monomer lens material which is placed over the resinous negative mold and allowed to polymerize to thereby form a lens having a finished optical surface.

* * * * *